(12) United States Patent
Hansson et al.

(10) Patent No.: US 6,991,830 B1
(45) Date of Patent: Jan. 31, 2006

(54) PROCESS FOR THE MANUFACTURING OF SURFACE ELEMENTS WITH A STRUCTURED UPPER SURFACE

(75) Inventors: Krister Hansson, Trelleborg (SE); Johan Lundgren, Malmo (SE); Hakan Wernersson, Lund (SE)

(73) Assignee: Pergo (Europe) AB, Trelleborg (SE)

( * ) Notice: Subject to any disclaimer, the term of this patent is extended or adjusted under 35 U.S.C. 154(b) by 348 days.

(21) Appl. No.: 09/718,401

(22) Filed: Nov. 24, 2000

(30) Foreign Application Priority Data

Dec. 23, 1999 (SE) .................................. 9904781

(51) Int. Cl.
*B05D 1/36* (2006.01)
*B05D 7/26* (2006.01)

(52) U.S. Cl. ...................... 427/466; 427/504; 427/510; 427/202; 427/204; 427/205; 427/261; 427/265

(58) Field of Classification Search ................ 427/258, 427/259, 261–263, 267, 282, 287, 496, 504, 427/508, 510, 199, 202–205, 466, 521, 264, 427/265; 52/316

See application file for complete search history.

(56) References Cited

U.S. PATENT DOCUMENTS

| | | | | |
|---|---|---|---|---|
| 3,811,915 | A | * | 5/1974 | Burrell et al. |
| 4,233,343 | A | * | 11/1980 | Barker et al. |
| 4,501,635 | A | * | 2/1985 | Siry et al. |
| 5,011,709 | A | * | 4/1991 | Arbogast et al. |
| 5,624,471 | A | * | 4/1997 | Gaeta et al. |
| 5,830,573 | A | * | 11/1998 | Lambert et al. |

FOREIGN PATENT DOCUMENTS

| | | | |
|---|---|---|---|
| DE | 19845496 | | 4/2000 |
| EP | 0106707 | | 4/1984 |
| GB | 1121082 | * | 7/1968 |
| GB | 2 324 982 | * | 11/1998 |
| GB | 2324982 | | 11/1998 |
| JP | 52010355 | | 1/1977 |
| JP | 56101817 | | 8/1981 |
| JP | 7003504 B | | 1/1982 |
| JP | 59155087 | | 1/1985 |
| JP | 61291075 | | 12/1986 |
| JP | 63062577 | | 3/1988 |
| JP | 1032789 B | | 7/1989 |
| JP | 4-126571 | * | 4/1992 |
| JP | 4126571 | | 4/1992 |

(Continued)

OTHER PUBLICATIONS

File WPI, Derwent accession No. 1977-12201Y, Eidai Co Ltd., "Forming a relief pattern on a substrate—by printing with ink, applying a curable resin contg. ink solvent and curing the resin".

(Continued)

*Primary Examiner*—Fred J. Parker
(74) *Attorney, Agent, or Firm*—Stevens, Davis, Miller & Mosher, L.L.P.

(57) ABSTRACT

A process for the manufacturing of a decorative surface element, which element comprises a base layer and a decorative upper surface. A wetting repellent lacquer is printed in a predetermined pattern on the decorative upper surface. The wetting repellent lacquer covers only parts of the decorative upper surface. A wear layer of a UV or electron beam curing lacquer is then applied on top of the decorative upper surface which UV or electron beam curing lacquer is repelled from the parts of the surface being covered by the wetting repellent lacquer whereby a surface structure is achieved.

37 Claims, 1 Drawing Sheet

FOREIGN PATENT DOCUMENTS

| | | | |
|---|---|---|---|
| JP | 06-008392 | * | 1/1994 |
| JP | 6008392 | | 1/1994 |
| JP | 10330647 | | 12/1998 |

OTHER PUBLICATIONS

File WPI, Derwent accession No. 1975-00846W, Noda Prywood Mfg Co., "Embossed decorative panel mfr- by applying fine particles to adhesive coated substrate then discontinuously painting".

File WPI, Derwent accession No. 1976-71165X, Matsushita Electric Works Ltd., "Decorative board of simulated woodgrain appearance—by coating substrate having attractive and repellant regions, leaving inorg material in repellant regions".

* cited by examiner

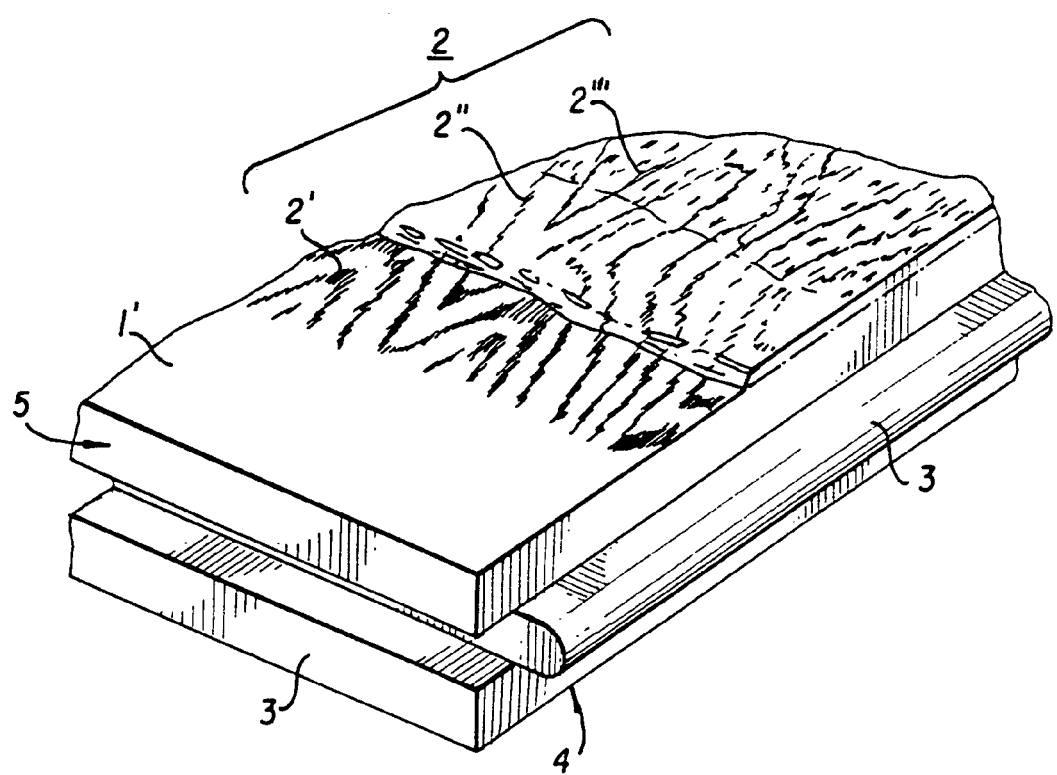

PROCESS FOR THE MANUFACTURING OF SURFACE ELEMENTS WITH A STRUCTURED UPPER SURFACE

BACKGROUND OF THE INVENTION

The present invention relates to a process for the manufacture of decorative surface elements with a surface structure matching the decor of the upper surface.

DESCRIPTION OF THE RELATED ART

Products coated with simulated versions of materials such as wood and marble are frequent today. They are foremost used where a less expensive material is desired, but also where resistance towards abrasion, indentation and different chemicals and moisture is required. As an example of such products floors, floor beadings, table tops, work tops and wall panels can be mentioned.

As an example of an existing product can be mentioned the thermosetting laminate which mostly consists of a number of base sheets with a decor sheet placed closest to the surface. The decor sheet can be provided with a desired decor or pattern. Frequently used patterns usually represent the image of different kinds of wood or minerals such as marble or granite. The surface of the laminate can, at the laminating procedure, be provided with a structure, which will make the decor more realistic. Press plates with structure or structure foils are here frequently used during the pressing of the laminate. A negative reproduction of the structure in the press plate or the foil will be embossed into the laminate surface during the laminating procedure.

The structure suitably represents features characteristic for the pattern the decor represents. The structure can be made coarse to simulate for example rough planed stone, or smooth with randomly placed pits and micro cracks to simulate polished marble. When the surface of wood is simulated the surface is provided with randomly placed thin oblong indentations which imitate pores.

It has for a long time been a great need to be able to manufacture simulated materials where a lacquer is used as a top coat on a decor. The only way, so far, to achieve a surface structure in lacquer is casting or abrasive moulding which both are time consuming and expensive processes.

SUMMARY OF THE INVENTION

The invention relates to a process for the manufacturing of a decorative surface element. The element comprises a base layer, a decor and a wear layer of a UV or electron beam curing lacquer.

The design of the décor can be achieved by utilising the process steps below;
  i) A segmentation pattern is selected, the segmentation comprising at least two décor segments on each surface element. The shape, as seen from above, of the surface element is hereby selected from the group; triangular, quadratic, rectangular, heptagonal, pentagonal and octagonal while the shape of the segments is selected from the group triangular, quadratic, rectangular, heptagonal, pentagonal, octagonal, circular, elliptical, perturbed and irregular.
  ii) A segment décor is then selected for each segment. The segment décor is selected from the group; digitised and simulated depiction of different kinds of wood, minerals and stone, different kinds of fabric, art work and fantasy based décor.
  iii) Each selection is made on a terminal where the selections emanates from a data base and that the selection is visualised via the terminal.

The décor is preferably achieved by digitisation of an actual archetype or by partly or completely being created in a digital media. The digitised décor is preferably stored digitally in order to be used as a control function and original, together with control programs and selection parameters, when printing the décor.

The dimensions of the surface to be covered by surface elements is suitably entered into the terminal and support programs calculates an installation pattern. The installation pattern calculation is suitably also used for printing an assembly instruction. In order to visualise the selection the installation pattern calculation is possibly used for printing a miniaturised copy of the calculated installation with the selected pattern and décor. The dimensions of the surface to be covered by surface elements is suitably entered into the terminal and that that support programs further calculates décor and segmentation pattern matching between the surface elements.

The selection is preferably also used, together with support programs for controlling further steps in the manufacturing procedure selected from the group; identification marking, positioning marking, packaging, lacquering, surface embossing, storing and delivery logistics.

An algorithm is suitably used for guiding the positioning of the décor segments and segmentation pattern so that a décor segment from one surface element may continue on an adjoining surface element. The control program is suitably used, together with décor data and selection parameters, for applying matching identification on the surface elements.

It is also possible to manufacture a designed larger surface with décor segments larger than a surface element by utilising the process as described below;
  i) A selected main décor is entered via a terminal, the selected décor emanating from a group consisting of; an archetype digitised via digital camera or scanner and a digitised décor from a database.
  ii) The dimensions of the surface to be covered by surface elements and the desired dimension of the décor is then entered into the terminal. Support programs are used for calculating the segmentation of the main décor to cover more than one surface element.
  iii) The result of the selections and calculations is finally visualised via the terminal.

The digitised main décor is stored digitally in order to be used as a control function and original, together with control programs and selection parameters, when printing the décor.

It is, in order to enhance the decorative effect of some decor possible to select a surrounding décor. A décor effect in the border between the main décor and the surrounding décor is suitably also selected, the selection being made from the group; fading, sharp edge, sharp edge with shadow effect, jagged edge, jagged edge with shadow and surrounding inlay of other décor.

The surrounding décor is preferably processed as follows;
  i) A segmentation pattern for the surrounding décor is selected. The segmentation comprising at least two décor segments on each surface element. The shape, as seen from above, of the surface element is preferably selected from the group; triangular, quadratic, rectangular, heptagonal, pentagonal and octagonal. The shape of the surface elements with surrounding décor and the shape of the surface elements which, of course, is selected so that they can be joined with each other. The shape of the segments is selected from the group triangular, quadratic, rectangular, heptagonal, pentagonal, octagonal, circular, elliptical, perturbed and irregular.

ii) A segment décor is then selected for each segment. The segment décor is selected from the group; digitised and simulated depiction of different kinds of wood, minerals and stone, different kinds of fabric, art work and fantasy based décor.

iii) Each selection is made on a terminal where the selections emanates from a data base. The selection is visualised via the terminal.

A décor effect in the border between the main décor and the surrounding décor is suitably selected. The selection is preferably made from the group; fading, sharp edge, sharp edge with shadow effect, jagged edge, jagged edge with shadow and surrounding inlay of other décor. Also this selection is made on the terminal.

The dimensions of the surface to be covered by surface elements is suitably entered into the terminal and support programs calculates an installation pattern. The installation pattern calculation is preferably used for printing an assembly instruction. The installation pattern calculation is according to one embodiment of the invention used for printing a miniaturised copy of the calculated installation with the selected pattern and décor. This print out may serve as an evaluation copy of the design before making decisions regarding the manufacturing.

The dimensions of the surface to be covered by surface elements is entered into the terminal. Support programs further calculates décor and segmentation pattern matching between the surface elements. The selections is preferably used, together with support programs for controlling further steps in the manufacturing procedure selected from the group; identification marking, positioning marking, packaging, lacquering, surface embossing, storing and delivery logistics. An algorithm is preferably used for guiding the positioning of the décor segments and segmentation pattern so that a décor segment from one surface element may continue on an adjoining surface element. The control program is then preferably used together with décor data and selection parameters for applying matching identification on the surface elements.

The surface elements may be used as floor, wall or ceiling boards. The surface elements are suitably manufactured through the following process;

i) A supporting core with a desired format is manufactured and provided with an upper side and a lower side.

ii) The upper side of the supporting core is then provided with a décor, by for example printing. The décor is positioned after a predetermined fixing point on the supporting core.

iii) The upper side of the supporting core is then provided with a protecting, at least partly translucent, wear layer by for example spray coating, roller coating, curtain coating and immersion coating or by being provided with one or more sheets of α-cellulose impregnated with thermosetting resin or lacquer.

The décor is suitably achieved by digitisation of an actual archetype or by partly or completely being created in a digital media. The digitised décor is stored digitally in order to be used as a control function and original, together with possible control programs, when printing the décor.

The décor may accordingly be obtained by making a high resolution or selected resolution digital picture of the desired décor. This is suitably made by means of a digital camera or scanner. The most common décor will of course be different kinds of wood and minerals like marble, as these probably will continue to be preferred surface decoration in home and public environments. It is, however, possible to depict anything that is visible. The digitised version of the décor is then edited to fit the size of the supporting core. It is also possible to rearrange the décor in many different ways, like changing colour tones, contrast, dividing the décor into smaller segments and adding other decorative elements. It is also possible to completely create the décor in a computer equipped for graphic design. It is possible to create a simulated décor so realistic that even a professional will have great problems in visually separating it from genuine material. This makes it possible to make for example floor boards with an almost perfect illusion of a rare kind of wood, like ebony or rose wood and still preserving trees under threat of extermination.

The digital décor is used together with guiding programs to control a printer. The printer may be of an electrostatic type or an ink-jet type printer. The resolution needed is much depending on the décor that is to be simulated, but resolutions of 10–1500 dots per inch (dpi) is the practical range in which most décor will be printed. Under normal conditions a resolution of 300–800 dpi is sufficient when creating simulations of even very complex decorative patterns and still achieve a result that visually is very difficult to separate from the archetype without close and thorough inspection.

The digitally stored décor can also be used together with support programs when guiding other operations and procedures in the manufacturing process. Such steps in the operation may include procedures like identification marking, packaging, lacquering, surface embossing, storing and delivery logistics as well as assembly instructions.

DETAILED DESCRIPTION OF THE INVENTION

It is advantageous to manufacture the supporting core in the desired end user format and to provide it with edges suited for joining before applying the décor and wear layer, since the amount of waste thereby is radically reduced. The décor matching tolerances will also be improved further by this procedure.

The main part of the supporting core is suitably constituted by a particle board or a fibre board. It is, however, possible to manufacture the core that at least partly consist of a polymer such as for example polyurethane or a polyolefin such as polyethylene, polypropylene or polybutene. A polymer based core can be achieved by being injection moulded or press moulded and can be given its shape by plastic moulding and does therefore not require any abrasive treatment. A polymer based core may except polymer also contain a filler in the form of a particle or fibre of organic or inorganic material, which besides the use a cost reducing material also will be used to modify the mechanical characteristics of the core. As an example of such suitable fillers can be mentioned; cellulose or wood particles, straw, starch, glass, lime, talcum, stone powder and sand. The mechanical characteristics that may be changed is for example viscosity, thermal coefficient of expansion, elasticity, density, fire resistance, moisture absorption capacity, acoustic properties, thermal conductivity, flexural and shearing strength as well as softening temperature.

The upper surface, i.e. the surface that is to be provided with décor, is suitably surface treated before the printing. Such surface treatment will then incorporate at least one of the steps, ground coating and sanding. It is also possible to provide the surface with a structure that matches the décor that is to be applied.

The translucent wear layer is suitably constituted by a UV- or electron beam curing lacquer such as an acrylic, epoxy, or maleimide lacquer. The wear layer is suitably applied in several steps with intermediate curing where the last one is a complete curing while the earlier ones are only partial. It will hereby be possible to achieve thick and plane layers. The wear layer suitably includes hard particles with an average particle size in the range 50 nm–150 µm. Larger particles, in the range 10 µm–150 µm, preferably in the range 30 µm–150 µm, is foremost used to achieve abrasion resistance while the smaller particles, in the range 50 nm–30 µm, preferably 50 nm–10 µm is used for achieving scratch resistance. The smaller particles are used closest to the surface while the larger ones are distributed in the wear layer. The hard particles are suitably constituted of silicon carbide, silicon oxide, α-aluminium oxide and the like. The abrasion resistance is hereby increased substantially. Particles in the range 30 mm–150 mm can for example be sprinkled on still wet lacquer so that they at, least partly, becomes embedded in finished wear layer. It is therefore suitable to apply the wear layer in several steps with intermediate sprinkling stations where particles are added to the surface. The wear layer can hereafter be cured. It is also possible to mix smaller particles, normally particle sizes under 30 µm with a standard lacquer. Larger particles may be added if a gelling agent or the like is present. A lacquer with smaller particles is suitably used as top layer coatings, closer to the upper surface.

The scratch resistance can be improved by sprinkling very small particles in the range 50 nm–1000 nm on the uppermost layer of lacquer. Also these, so called nano-particles, can be mixed with lacquer, which with is applied in a thin layer with a high particle content. These nano-particles may besides silicon carbide, silicon oxide and α-aluminium oxide also be constituted of diamond. The décor on the surface elements is suitably constituted by a number of décor segments with intermediate borders, which borders, on at least two opposite edges coincides with intended, adjacent surface elements.

Thus, the invention relates to a process for providing the decorative surface elements with a surface structure that in all essential aspects matches the décor. The decorative surface element also comprises a base layer and a decorative upper surface. The invention is characterised in that;

i) A wetting repellent lacquer is printed in a predetermined pattern on the decorative upper surface, the wetting repellent lacquer covering only parts of the decorative upper surface.

ii) A wear layer of a UV or electron beam curing lacquer is then applied on top of the decorative upper surface. The UV or electron beam curing lacquer is repelled from the parts of the surface being covered by the wetting repellent lacquer whereby a surface structure is achieved.

The UV or electron beam curing lacquer preferably consists of an acrylic, epoxy or a maleimide lacquer. The wear layer is preferably applied in several steps with intermediate partial curing. The wear layer preferably also includes hard particles with an average particle size in the range 50 nm–150 µm in order to increase the wear resistance. These hard particles suitably consists of for example silicon oxide, α-aluminium oxide or silicon carbide. According to an alternative embodiment of the invention the main part of the hard particles may consists of the silicon oxide, α-aluminium oxide or silicon carbide while a smaller amount of the hard particles consist of diamond. The hard particles consisting of diamond is then in the average particle size range 50 nm–2 µm and is placed close to the upper surface of the wear layer.

The wetting repellent lacquer is preferably also constituted of a UV or electron beam curing lacquer with a content of silicone polymer. It is suitable to use a wetting repellent lacquer which also comprises UV or electron beam curing acrylic, epoxy or a maleimide lacquer, and is thereby chemically compatible with the wear layer. The wetting repellant lacquer is suitably translucent or semi-translucent, whereby the cured wetting repellant lacquer has translucent parts as well as transparent or opaque parts.

It is possible to enhance the structuring by adding pigmentation in the wetting repellent lacquer which will create a shadow effect in the structure. According to an alternative, with wetting repellant lacquer includes a matting agent which also creates a structure enhancing effect in the structure. Such a structure enhancing effect generally includes a pattern or other design created by the pigmentation in the cured wetting repellent lacquer.

As described earlier, the decorative upper surface comprises a decor layer, which decor layer originates from a digitally stored original. The digitally stored original is preferably processed in order to achieve a digital structure original whereby a surface structure that in every essential aspect matches the decor is achieved. The wetting repellent lacquer is then suitably applied by means of an ink-jet printer which may be controlled by a computer.

The base layer suitably consists of a particle board or a fibre board but may also mainly consist of a polymer such as polyurethane.

It is according to the present invention possible to achieve matching structure on even particularly characteristic décor segments such as borderlines between simulated slabs, bars, blocks or the like and also knots, cracks, flaws and grain which is visually simulated in the décor. The structure may be stored as digital data. Said data may be used for guiding automated printers when providing said characteristic décor segments with a suitable surface structure. Said printing process is synchronised via the predetermined fixing point on the surface element.

The process described in the present application, for manufacturing surface elements is very advantageous from a logistic point of view since the number of steps when achieving a new décor is radically reduced. It is, according to the present invention possible to use digitally created or stored data for directly printing the décor on a surface element by using a ink-jet printer or a photo-static printer. The so-called set up time will thereby be very short, whereby even very special customer requirements may be met at a reasonable cost. It is according to the present invention possible to manufacture, for example, a world map with matching surface structure in very large format, stretching over a great number of surface elements without any disrupting deviations in décor and structure matching, to mainly the same cost as bulk produced surface elements. Since the décor and surface structure may be handled digitally all the way to the point of being applied to the surface of the core, set up times will be practically non-existent while at the same time a high degree of automation will be practicable. It is also possible to automatically provide the surface elements with identification and orientation marking which would make the installation of complex décor, like world maps in the example above, much easier. This has so far been impossible.

Surface elements manufactured as described above is suitably used as a floor covering material where the demands on stability and scratch and abrasion resistance is great. It is, according to the present invention, also possible to use the surface elements as wall and ceiling decorative material. It will however not be necessary to apply thick wear layer coatings in the latter cases as direct abrasion seldom occurs on such surfaces.

The invention is described further in connection to an enclosed FIGURE, embodiment examples and schematic process descriptions showing different embodiments of the invention.

BRIEF DESCRIPTION OF THE DRAWINGS

Accordingly, the FIGURE shows parts of a surface element 1 which includes an upper decorative layer 2, edges 3 intended for joining, a lower side 4 and a supporting core 5. The process is initiated by manufacturing a supporting core 5 with a desired format and edges 3 intended for joining. The supporting core 5 is further provided with an upper side 1' suited for printing and a lower side 4. The upper side 1' of the supporting core 5 is then provided with a décor 2' by printing, utilising an ink-jet printer. The décor 2' is oriented after a predetermined fixing point on the supporting core 5. The upper side 1' of the supporting core 5 is provided with a protecting translucent wear layer 2" through curtain coating. The supporting core 5 is constituted by particle board or fibre board. The translucent wear layer 2" is constituted by a UV-curing acrylic lacquer which is applied in several steps with intermediate curing, of which the last one is a complete curing while the earlier ones are only partial curing. The wear layer 2" also includes hard particles of α-aluminium oxide with an average particle size in the range 0.5 $\mu$m–150 $\mu$m.

The décor side of the surface element 1 is provided with a surface structure 2''' which enhances the realism of the décor 2'. It possible to simulate the surface structure of, for example, wood block chevron pattern décor.

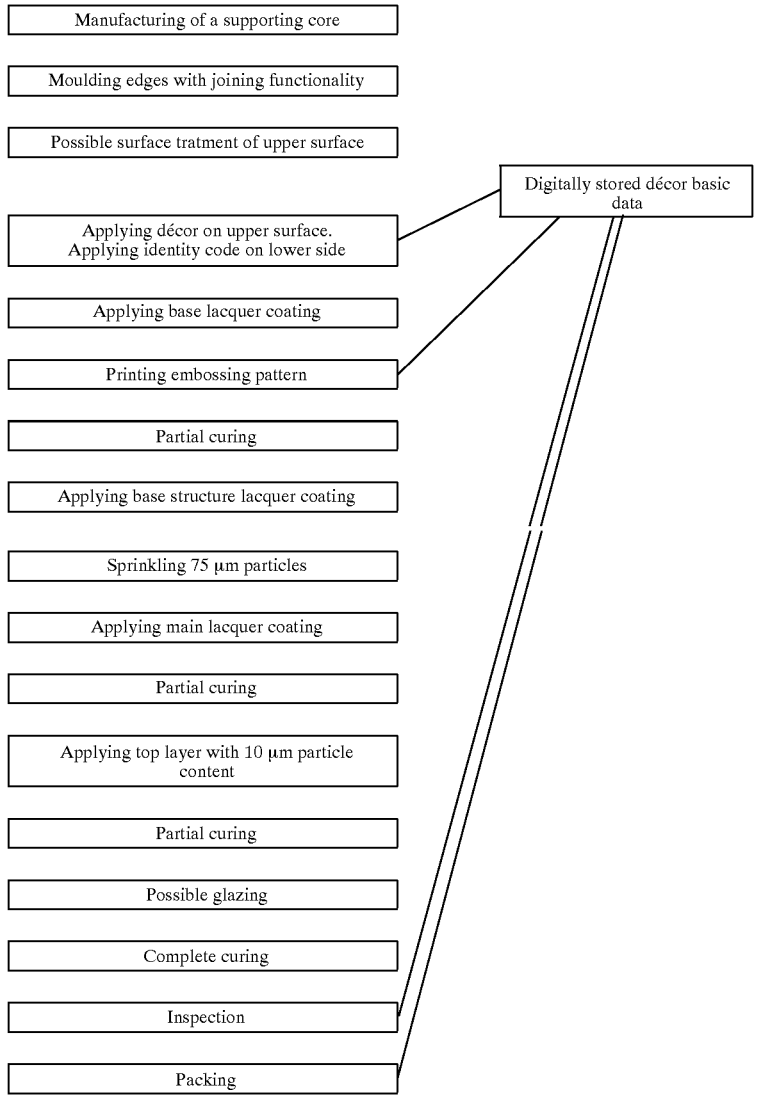

A supporting polymer and filler based core is manufactured in the desired format and is provided with an upper side, a lower side and edges provided with joining members, such as tongue and groove. The upper side of the supporting core is then sanded smooth after which a primer is applied. A décor is then applied on the upper side by means of a digital photo-static five colour printer. The colours are magenta, yellow, cyan, white and black. The décor is positioned from a predetermined fixing point in form of a corner of the supporting core, while the décor direction is aligned with the long side edge initiating from the same corner.

The basis for the décor is stored as digital data. This digital data has been achieved by digitising a number of wood grain patterns with a digital camera. A number of rectangular blocks with a fixed width, but of varying length is selected and parted from the digital wood grain pictures. The width of the rectangular blocks is selected so that three block widths equals the width of a supporting core. The digital image of the wood blocks are then classified after wood grain pattern and colour so that a number of groups is achieved. The groups are; fair wood with even grain, dark wood with even grain, fair wood with knots and flaws, dark wood with knots and flaws, fair cross-grained wood and finally dark cross-grained wood. Each group contains five different block simulations. An algorithm is feed into a computer which is used for the guiding of the printing operation so that the simulated wood blocks is digitally placed in three longitudinal rows and mixed so that two similar wood blocks never is placed next to each other. The algorithm will also guide the position of the latitudinal borderlines between the simulated wood blocks so that they are unaligned with more than one block width between adjacent rows. It will also guide the latitudinal position of the borderlines so that it either aligns with the shorter edges of the supporting core or is unaligned with more than one block width. Another printer, also guided by the computer, is utilised for printing a running matching number on the lower side short side edges. The décor will hereby continue longitudinally over the surface elements and a perfect matching is obtained when the surface elements are placed in numerical order.

A basic layer of UV-curing acrylic lacquer is then applied by means of a rollers. The basic layer is then cured to the desired viscosity. The surface structuring is then initiated by printing the part of the structure that is to form recesses in the finished surface. A UV-curing acrylic wetting repellent lacquer with a content of silicone polymer is printed by means of an ink-jet printer in the desired pattern. The pattern is made up by narrow lines of varying length and will cover less than 5% of the total surface of the surface element. The ink-jet printer is controlled by a computer where the digital décor used earlier is processed to receive a digital structure matching the décor in aspects like grain direction and density, flaws, knots and border lines between simulated wood blocks. This processing may be achieved by an automatic process where an algorithm is used as a digital filter or by manual operation during the scanning procedure. By this procedure a surface structure matching all essential aspects of the décor is achieved.

A second basic layer of UV-curing acrylic lacquer is then applied by means of a rollers. The lacquer will be repelled from the parts of the surface where the wetting repellent lacquer is present resulting in recesses in the surface. Particles with an average particle size in the range 75 $\mu$m is then sprinkled onto the still wet second basic layer, whereby the main layer of UV-curing acrylic lacquer is applied by roller coating. The lacquer is then cured using UV-light whereby the viscosity of the lacquer increases. A top layer of UV-curing acrylic lacquer with an additive in the form of hard particles with an average size of 10 $\mu$m, is then applied by means of a roller. The lacquer is then cured with UV-light so that the viscosity increases. It may, in some cases, be advantageous to perform a glazing operation on the top surface in order to make the edges between the main upper surface and the recesses more well defined. This is suitably achieved by pressing a heated roller towards the surface. The surface temperature of the roller is then suitably between 40 and 150° C.

The lacquer is then, if not already completely cured at a prior stage in the process, completely cured with UV-light to desired strength. The finished surface elements may then be inspected by the naked eye or by a digital camera supported by a computer. The surface elements are then packed in batches which are provided with identification markings.

The process above will make it possible to have a completely customer driven manufacturing where even very small quantities may be produced with the same efficiency as bulk manufacturing. Even though only one décor is described in connection to the process scheme above, it becomes clear to anyone skilled in the art, that a décor is changed very easily in the process. All of the important steps of the manufacturing such as printing, structuring, inspection, packaging and identification marking may be controlled and supervised by central processing data. This will make it logistically possible to manufacture customer designed décor. Such a process is exemplified as follows;

The customer utilises a database via Internet or at a local dealer. It is also possible for another operator to utilise a database. The database contains samples and/or reduced resolution copies of a great variety of standard décor which can be combined after predetermined parameters.

The parameters may, for example, concern a single surface element where, for example, chevron pattern, diamond pattern and block pattern may be the choices of décor segmentation. It will here be possible to select a set of different simulations to randomly or by selected parameters fill the segments, for example, marble, birch and mahogany. The customer may also add an inlay from a design of his own which is digitised and processed, preferably automatically, to a desired format and resolution.

The parameters may alternatively include décor segments that requires the space of several surface elements, for example a map over the world. The parameters may here further include fading of the larger design to a surrounding décor, surrounding frame of other décor etc.

The customers enters the measurements of the surface that is to be covered by the surface elements. The customer then makes selections from the database and is able to see his selection as a completed surface, either on screen or by printing. The visualisation program used, is suitably also used for calculating installation pattern and presenting installation instructions with identification numbers on surface elements and where to cut the elements in order to make a perfect match. The surface elements may also be provided with removable matching lines on the decorative side making matching of décor between adjacent rows easier. The customer or dealer may then confirm his order via electronic mail where the pattern and décor is reduced to a code sequence and the order can be the direct input to the computer guiding the manufacturing process as described above. The customer and/or dealer data follows the manufacturing process all the way to packaging and a fully customer guided manufacturing process is achieved.

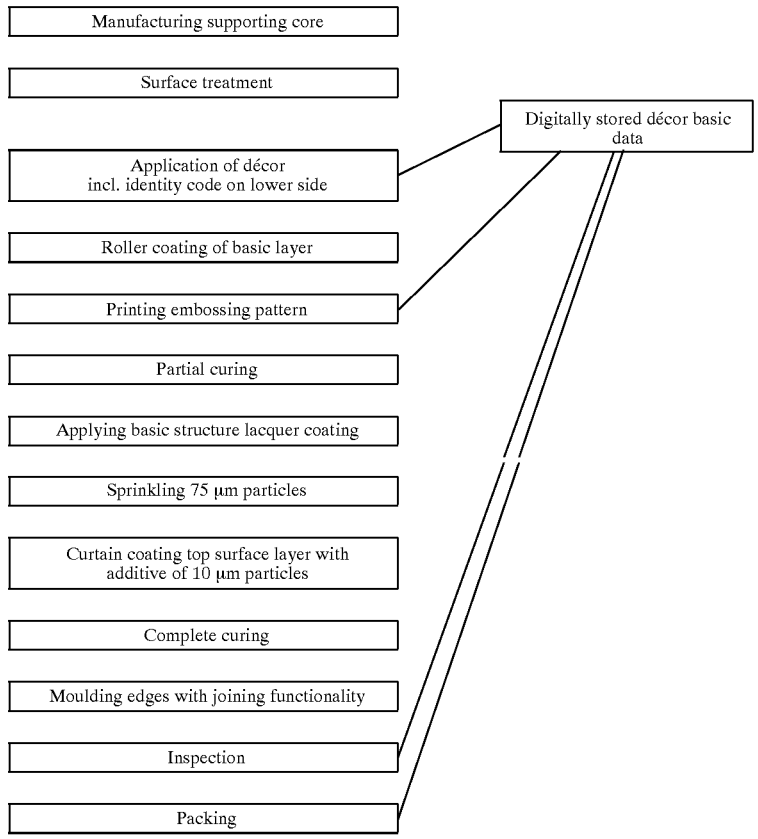

Process scheme 2

A supporting fibre board based core is manufactured in the desired format and is provided with an upper side, a lower side and edges. The upper side of the supporting core is then sanded smooth after which a white primer is applied. A décor is then applied on the upper side by means of a digital inc-jet four colour printer. The colours are magenta, yellow, cyan and black. The décor is positioned from a predetermined fixing point in form of a corner of the supporting core, while the décor direction is aligned with the long side edge initiating from the same corner.

The basis for the décor is stored as digital data. This digital data has been achieved by digitising a number of wood grain patterns with a digital camera. A number of rectangular blocks with a fixed width, but of varying length are selected and parted from the digital wood grain pictures. The width of the rectangular blocks is selected so that three block widths equals the width of a finished surface element. The digital image of the wood blocks are then joined digitally to form a rectangular surface of a specified size, for example, 200×1200 mm. A selected amount of such combinations of different blocks are designed as described above so that a number of slightly different rectangular surfaces is achieved. The printer, or preferably a set of printers are positioned so that a desired number of rectangular décor surfaces with a specified intermediate distance is printed on the supporting core. The intermediate distance between the rectangular surfaces is the distance needed for parting and moulding of edges. The décor printer or printers are also used for printing fixing points at predetermined positions.

Another printer, also guided by the computer, is utilised for printing an identity code on the lower side of each intended finished surface element.

A basic layer of UV-curing acrylic lacquer is then applied by means of rollers. The surface structuring is then initiated by printing the part of the structure that is to form recesses in the finished surface. A UV-curing acrylic wetting repellent lacquer with a content of silicone polymer is printed by means of an ink-jet printer in the desired pattern. The pattern is made up by narrow lines of varying length and will cover less than 5% of the total surface of the surface element. The ink-jet printer is controlled by a computer where the digital décor used earlier is processed to receive a digital structure matching the décor in aspects like grain direction and density, flaws, knots and border lines between simulated wood blocks. This processing may be achieved by an automatic process where an algorithm is used as a digital filter or by manual operation during the scanning procedure. By this procedure a surface structure matching all essential aspects of the décor is achieved.

A second basic layer of UV-curing acrylic lacquer is then applied by means of rollers. The lacquer will be repelled from the parts of the surface where the wetting repellent lacquer is present resulting in recesses in the surface. Particles with an average particle size in the range 75 $\mu$m is then sprinkled onto the still wet second basic layer, whereby the main layer of UV-curing acrylic lacquer with an additive in the form of hard particles with an average size of 10 $\mu$m, is applied by means of a roller. The lacquer is then completely cured with UV-light to desired strength, whereby the finished surface element is cut into the predetermined formats which are provided with edges with joining functionality are moulded by milling. The cutting and edge moulding process is positioned from fixing point printed close to the décor. The surface elements may then be inspected by the naked eye or by a digital camera supported by a computer. The surface elements are then packed in batches and provided with identification markings.

It is, according to an alternative procedure in the process, possible to cut and mould the edges at an earlier stage in the process. It is suitable to apply and cure a protecting layer of lacquer and possibly the UV-curing acrylic wetting repellent lacquer on top of the printed décor followed by cutting and moulding of the edges. The remaining and main part of the wear layer is then applied as described in connection to process scheme 1 or 2 above.

The process above will make it possible to have a customer initiated manufacturing where even very small quantities may be produced with the same efficiency as bulk manufacturing. Even though only one décor is described in connection to the process scheme above, it becomes clear anyone skilled in the art, that décor is changed very easily in the process. All of the important steps of the manufacturing such as printing, structuring, inspection, packaging and identification marking may be controlled and supervised by central processing data.

The invention is also described through embodiment examples.

EXAMPLE 1

A supporting core of medium density fibre board were sanded smooth. A layer of primer lacquer were applied on top of the fibre board. The primer were cured after which a decor was printed on top of the primer.

The build up of a structured wear layer was then initiated by applying 10 g/m² of UV-curing acrylic lacquer by means of roller coating. The surface structuring was then initiated by printing the part of the structure that is to form recesses in the finished surface. A UV-curing acrylic wetting repellent lacquer with a content of silicone polymer was printed by means of an ink-jet printer in the desired pattern. The pattern was made up by narrow lines of varying length and covered less than 2% of the total surface of the surface element. The wetting repellent lacquer was then exposed to a predetermined energy amount of UV-light so that it cured. 30 g/m² of UV-curing acrylic lacquer by means of roller coating. The lacquer was repelled from the parts of the surface where the wetting repellent lacquer was present which resulted in recesses in the surface. 20 g/m² of hard particles made of α-aluminium oxide with an average particle size of 70 µm were sprinkled on the still sticky lacquer. The lacquer was then exposed to a predetermined energy amount of UV-light so that it cured only partly and the viscosity was increased. Residual particles were then removed by blowing a high pressure air stream over the surface. Another 30 g/m² of UV-curing acrylic lacquer was then roller coated onto the already applied layer after which another 20 g/m² of α-aluminium, oxide particles with an average particle size of 70 µm were sprinkled on the still sticky second coating. The lacquer was then exposed to a predetermined energy amount of UV-light so that it cured only partly and the viscosity was increased. Again, residual particles were then removed by blowing a high pressure air stream over the surface. Three layers of UV-curing acrylic lacquer was then applied by roller coating with intermediate partial curing as a above. Each of the three layers had a surface weight of 20 g/m². The hard particles were completely embedded in the lacquer after the three layers were applied and a plane upper wear layer surface was achieved.

A top coating procedure was then initiated. A first layer of UV-curing acrylic topcoat lacquer was applied by means of a roller coater on top of the previous, partly cured, layers. The topcoat lacquer contained 10% by weight of hard particles of α-aluminium oxide with an average particle size of 10 µm. The first layer was applied to a surface weight of 10 g/m². The topcoat lacquer was then exposed to a predetermined energy amount of UV-light so that it cured only partly and the viscosity was increased. A second and a third layer of the topcoat lacquer was then applied and partly cured as described above. All layers were then exposed to a predetermined energy amount of UV-light so that it cured completely.

The wear layer was then tested for abrasion resistance according to ISO 4586/2-88, where an IP value of 7000 turns was obtained. An IP value of 7000 turns is fully sufficient for floor covering materials with medium to heavy traffic like hotel lobbies, hallways and the like.

EXAMPLE 2

A supporting core of medium density fibre board were sanded smooth. A layer of primer lacquer were applied on top of the fibre board. The primer were cured after which a decor was printed on top of the primer.

The build up of a wear layer was then initiated by applying 30 g/m² of UV-curing acrylic lacquer by means of roller coating. 20 g/m² of hard particles made of α-aluminium oxide with an average particle size of 70 µm were sprinkled on the still sticky lacquer. The lacquer was then exposed to a predetermined energy amount of UV-light so that it cured only partly and the viscosity was increased. Another 30 g/m² of UV-curing acrylic lacquer was then roller coated onto the already applied layer after which another 20 g/m² of α-aluminium oxide particles with an average particle size of 70 µm were sprinkled on the still sticky second coating. The lacquer was then exposed to a predetermined energy amount of UV-light so that it cured only partly and the viscosity was increased. Three layers of UV-curing acrylic lacquer was then applied by roller coating with intermediate curing as a above. Each of the three layers had a surface weight of 20 g/m². The hard particles were completely embedded in the lacquer after the three layers were applied and a plane upper wear layer surface was achieved. Also the uppermost of the three layers of lacquer was cured to a desired viscosity.

A second décor layer was then printed on top of the wear layer. The second décor layer, which was identical to the first décor closest to the core, was oriented and positioned so that it completely matched the first décor. The build up of a structured upper wear layer was then initiated by applying 10 g/m² of UV-curing acrylic lacquer by means of roller coating. The surface structuring was then initiated by printing the part of the structure that is to form recesses in the finished surface. A UV-curing acrylic wetting repellent lacquer with a content of silicone polymer was printed by means of an ink-jet printer in the desired pattern. The pattern was made up by narrow lines of varying length and covered less than 2% of the total surface of the surface element. The wetting repellent lacquer was then exposed to a predetermined energy amount of UV-light so that it cured. 30 g/m² of UV-curing acrylic lacquer by means of roller coating. The lacquer was repelled from the parts of the surface where the wetting repellent lacquer was present which resulted in recesses in the surface. 20 g/m² of hard particles made of α-aluminium oxide with an average particle size of 70 μm were sprinkled on the still sticky lacquer. The lacquer was then exposed to a predetermined energy amount of UV-light so that it cured only partly and the viscosity was increased. Residual particles were then removed by blowing a high pressure air stream over the surface. Another 30 g/m² of UV-curing acrylic lacquer was then roller coated onto the already applied layer after which another 20 g/m² of α-aluminium oxide particles with an average particle size of 70 μm were sprinkled on the still sticky second coating. The lacquer was then exposed to a predetermined energy amount of UV-light so that it cured only partly and the viscosity was increased. Again, residual particles were then removed by blowing a high pressure air stream over the surface. Three layers of UV-curing acrylic lacquer was then applied by roller coating with intermediate curing as a above. Each of the three layers had a surface weight of 20 g/m². The hard particles were completely embedded in the lacquer after the three layers were applied and a plane upper wear layer surface was achieved.

A top coating procedure was then initiated. A first layer of UV-curing acrylic topcoat lacquer was applied by means of a roller coater on top of the previous, partly cured, layers. The topcoat lacquer contained 10% by weight of hard particles of α-aluminium oxide with an average particle size of 10 μm. The first layer was applied to a surface weight of 10 g/m². The topcoat lacquer was then exposed to a predetermined energy amount of UV-light so that it cured only partly and the viscosity was increased. A second and a third layer of the topcoat lacquer was then applied and partly cured as described above. The wear layer was exposed to a predetermined energy amount of UV-light so that it cured completely.

The wear layer was then tested for abrasion resistance according to ISO 4586/2-88, where an IP value of 13200 turns was obtained. An IP value of 13200 turns is fully sufficient for floor covering materials with heavier traffic like airports, railway stations and the like. The second layer of décor and wear layer will add abrasion resistance without having obtained an unwanted hazy effect in the décor.

EXAMPLE 3

A supporting core of medium density fibre board were sanded smooth. A layer of primer lacquer were applied on top of the fibre board. The primer were cured after which a decor was printed on top of the primer.

The build up of a structured wear layer was then initiated by applying 10 g/m² of UV-curing acrylic lacquer by means of roller coating. The surface structuring was then initiated by printing the part of the structure that is to form recesses in the finished surface. A UV-curing acrylic wetting repellent lacquer with a content of silicone polymer was printed by means of an ink-jet printer in the desired pattern. The pattern was made up by narrow lines of varying length and covered less than 2% of the total surface of the surface element. The wetting repellent lacquer was then exposed to a predetermined energy amount of UV-light so that it cured. 15 g/m² of UV-curing acrylic lacquer by means of roller coating. The lacquer was repelled from the parts of the surface where the wetting repellent lacquer was present which resulted in recesses in the surface. 20 g/m² of hard particles made of α-aluminium oxide with an average particle size of 70 μm were sprinkled on the still sticky lacquer. The lacquer was then exposed to a predetermined energy amount of UV-light so that it cured only partly and the viscosity was increased. Residual particles were then removed by blowing a high pressure air stream over the surface. One layer of UV-curing acrylic lacquer was then applied by roller coating and was partially cured as above. The layer had a surface weight of 40 g/m². The hard particles were embedded in the lacquer after the layer of lacquer was applied and a mainly plane upper wear layer surface was achieved.

A top coating procedure was then initiated. A first layer of UV-curing acrylic topcoat lacquer was applied by means of a roller coater on top of the previous, cured, layers. The topcoat lacquer contained 10% by weight of hard particles of α-aluminium oxide with an average particle size of 10 m. The first layer was applied to a surface weight of 10 g/m². The topcoat lacquer was then exposed to a predetermined energy amount of UV-light so that it cured only partly and the viscosity was increased. A second, final layer of the topcoat formulation was then applied on top of the previous layer. Also the second layer of top coat was applied to a surface weight of 10 g/m². The wear layer was then exposed to a predetermined energy amount of UV-light so that it cured completely.

The wear layer was then tested for abrasion resistance according to ISO 4586/2-88, where an IP value of 3000 turns was obtained. An IP value of 3000 turns is fully sufficient for floor covering materials with light traffic like bedrooms, living rooms and the like.

EXAMPLE 4

A supporting core of medium density fibre board were sanded smooth. A layer of primer lacquer were applied on top of the fibre board. The primer were cured after which a decor was printed on top of the primer.

The surface structuring was then initiated by printing the part of the structure that is to form recesses in the finished surface. A UV-curing acrylic wetting repellent lacquer with a content of silicone polymer was printed by means of an ink-jet printer in the desired pattern. The pattern was made up by narrow lines of varying length and covered less than 1% of the total surface of the surface element. The wetting repellent lacquer was then exposed to a predetermined energy amount of UV-light so that it cured. 50 g/m² of UV-curing acrylic lacquer which contained 10% by weight of hard particles of α-aluminium oxide with an average particle size of 110 μm were applied by means of roller coating. The lacquer was repelled from the parts of the surface where the wetting repellent lacquer was present which resulted in recesses in the surface. The lacquer was then exposed to a predetermined energy amount of UV-light so that it cured only partly and the viscosity was increased.

A top coating procedure was then initiated. A first layer of UV-curing acrylic topcoat lacquer was applied by means of a roller coater on top of the previous, partly cured, layer. The topcoat lacquer contained 10% by weight of hard particles of α-aluminium oxide with an average particle size of 10 μm. The first layer was applied to a surface weight of 10 g/m². The topcoat lacquer was then exposed to a predetermined energy amount of UV-light so that it cured completely.

The wear layer was then tested for abrasion resistance according to ISO 4586/2-88, where an IP value of 280 turns was obtained. An IP value of 280 turns could be sufficient for floor covering materials with light traffic like bedrooms, living rooms and the like.

The invention is not limited to the embodiments shown as these can be varied in different ways within the scope of the invention. It is for example possible to plane the surface by pressing one or more glazing rollers towards the surface structured wear layer before or after the complete curing stage. The glazing rollers are preferably also heated to a surface temperature above 30° C., preferably in the range 35° C.–100° C.

The hard particles added to the lacquer consists of for example silicon oxide, α-aluminium oxide or silicon carbide. According to one embodiment of the invention the main part of the hard particles consists of for example silicon oxide, α-aluminium oxide or silicon carbide while a smaller amount of the hard particles consist of diamond. The hard particles consisting of diamond is then in the average particle size range 50 nm–2 μm and is placed close to the upper surface of the wear layer.

What is claimed is:

1. A process for the manufacturing of a building panel, the building panel comprising a core, a decorative upper surface, a lower surface, and edges joining the upper and lower surfaces, the edges being at least one of a tongue-and a groove, the upper surface comprises a base layer and a decorative upper surface, the process comprising,
   i) providing the decorative upper surface with a decor layer, the decor layer comprising a pattern;
   ii) printing a wetting repellant lacquer in a predetermined pattern on the decorative upper surface, at least partially matching the pattern on the decor layer, the wetting repellant covering only part of the decorative upper surface, thereafter
   iii) applying a wear layer of a UV or electron beam curing lacquer on top of the decorative upper surface, which UV or electron beam curing lacquer is repelled from the part of the surface being covered by the wetting repellant lacquer whereby a surface feature is achieved;
   iv) sprinkling abrasion resistant particles, the particles being at least one selected from the group consisting of α-aluminum oxide, silicone carbide, silicon oxide and diamond, on the surface element;
   v) curing the wear layer; and
   vi) removing a portion of the particles by applying a high pressure air stream, thereby providing the building panel.

2. A process according to claim 1, wherein said UV or electron beam curing lacquer consists of one selected from the group consisting of an acrylic, epoxy and a maleimide lacquer.

3. A process according to claim 1, wherein the applying step comprises multiple applications of the wear layer with intermediate partial curing between each of the multiple applications.

4. A process according to claim 1, wherein the particles have a hardness greater than the hardness of the cured wear layer and an average particle size in the range of 50 nm–150 μm.

5. A process according to claim 4, wherein the particles comprise scratch resistant particles selected from the group consisting of diamond, silicon oxide, α-aluminum oxides, silicon carbide and mixtures thereof.

6. A process according to claim 4, wherein a first amount of the particles consist of one selected from the group consisting of silicon oxide, α-aluminum oxide and silicon carbide, while a smaller amount of the particles consist of diamond.

7. A process according to claim 6, wherein the particles consist of diamond, having an average particle size in the range of 50 nm–2 μm, and are placed close to the upper surface of the wear layer, such that the particles provide the wear layer with abrasion resistance.

8. A process according to claim 1, wherein the wetting repellant lacquer comprises a UV or electron beam curing lacquer and a silicone polymer.

9. A process according to claim 8, wherein the wetting repellant lacquer comprises UV or electron beam curing acrylic, epoxy or a maleimide lacquer.

10. A process according to claim 8, wherein the wetting repellent lacquer is translucent.

11. A process according to claim 8, wherein the wetting repellent lacquer is translucent in at least one part and transparent or opaque in at least one other part.

12. A process according to claim 11, wherein the wetting repellent lacquer comprises a matting agent, whereby the matting agent creates a structure enhancing shadow effect.

13. A process according to claim 11, wherein the wetting repellent lacquer includes a matting agent, whereby the matting agent creates a structure enhancing effect.

14. A process according to claim 8, wherein the wetting repellant lacquer is cured before the step where the wear layer is applied.

15. A process according to claim 1, wherein the decor layer is produced from a digitally stored original, that the digitally stored original is processed in order to achieve a digital structure original whereby a surface structure that matches the decor is achieved through one or more processes selected from the group consisting of printing, embossing, molding, and rolling of at least a portion of the digital structure original.

16. A process according to claim 8, wherein the printing comprises applying the wetting repellent lacquer by means of an ink-jet printer.

17. A process according to claim 1, wherein the base layer consists of a particle board or a fibre board.

18. A process according to claim 1, wherein the base layer comprises a polymer.

19. A process according to claim 1, wherein, the decor layer is formed by a process comprising processing a digitally stored image.

20. A process according to claim 19, wherein the digitally stored image resembles a structure selected from the group consisting of wood and minerals.

21. A process according to claim 19, wherein the processing comprises editing the digitally stored image by at least one selected from the group consisting of digitizing a number of wood grains, scanning a desired pattern, changing color tones, adjusting contrast, dividing the image into smaller images and adding other decorative elements.

22. A process according to claim 19, wherein the digitally stored image comprises dark sections and light sections and the printing comprises depositing the wetting repellent lacquer on the dark sections.

23. A process according to claim 1, wherein the decor layer comprises a wood pattern, comprising one or more selected from the group consisting of knots, cracks, flaws and grains.

24. A process according to claim 23, wherein said printing comprises applying the wetting repellent lacquer in a configuration identical to the pattern in the decor layer.

25. A process according to claim 3, wherein said printing comprises applying the wetting repellent lacquer in a configuration to enhance the pattern.

26. A process for process for the manufacturing of a building panel, the building panel comprising a core, a decorative upper surface, a lower surface, and edges joining the upper and lower surfaces, the edges being provided with at least one of a tongue and a groove, the process comprising:

applying a primer to a panel to form a primed panel;
providing a decor layer on the primer, the decor layer comprising a pattern;
printing wetting repellant lacquer on parts of the primed panel, matching the decor layer;
placing a layer of UV or electron curing lacquer on the wetting repellent lacquer, whereby the UV or electron beam curing lacquer is repelled from the parts of the primed panel where the wetting repellant lacquer has been printed;
sprinkling abrasion resistant particles on the surface element, the particles being at least one selected from the group consisting of α-aluminum oxide, silicone carbide, silicon oxide and diamond;
curing the UV or electron curing lacquer; and
removing a portion of the hard particles by applying a high pressure air stream.

27. A process according to claim 1, further comprising repeating each of steps iii through vi, at least one time, in sequence, to achieve a plurality of cured layers comprising the abrasion resistant particles.

28. A process for process for the manufacturing of a building panel, the building panel comprising a core, a decorative upper surface, a lower surface, and edges joining the upper and lower surfaces, the edges being provided with at least one of a tongue and a groove, the process comprising process for the manufacturing of a decorative surface element, which element comprises a base layer and a decorative upper surface, the process comprising,
  i) selecting a digitized design at a first location;
  ii) transmitting the digitized design to a second location, remote from the first location;
  iii) providing the decorative upper surface with a decor layer, the decor layer comprising a pattern, the pattern being derived from the digitized design;
  iv) printing a wetting repellant lacquer in a predetermined pattern on the decorative surface, at least partially matching the pattern on the decor layer, the wetting repellant covering only part of the decorative surface, and thereafter
  v) applying a wear layer of a UV or electron beam curing lacquer on top of the upper surface, which UV or electron beam curing lacquer is repelled from the part of the surface being covered by the wetting repellant lacquer whereby a surface feature is achieved.

29. A process according to claim 28, wherein the transmitting comprises sending the digitized design via a computer network.

30. A process according to claim 29, wherein the computer network is the Internet.

31. A process according to claim 28, wherein the digitized design is selected from a database of selectable designs.

32. A process according to claim 28, further comprising digitizing an image to achieve the design.

33. A process for the manufacturing of decorative surface, the surface being formed from a plurality of building panels, the building panels together forming a decorative surface, each building panel comprising an upper surface having a surface area, a lower surface, and edges joining the upper and lower surfaces, the edges being provided with at least one of a tongue and a groove, the process comprising,
  i) selecting a design at a first location, wherein the design has a size larger than the surface area of each surface element;
  ii) dividing the design into a plurality of segments, each segment having a surface area corresponding to the surface area of one of the upper surfaces;
  iii) providing the upper surfaces with decor layers, the decor layers each comprising one segment of the design, such that when the building panels surface are installed, the design is reproduced across the plurality of building panels.

34. A process according to claim 33, further comprising;
  iv) printing a wetting repellant lacquer in a predetermined pattern on the upper surfaces, at least partially matching the segments on the decor layers, the wetting repellant covering only part of the upper surface, and thereafter
  v) applying a wear layer of a UV or electron beam curing lacquer on top of the upper surfaces, which UV or electron beam curing lacquer is repelled from the part of the surface being covered by the wetting repellant lacquer whereby a surface feature is achieved.

35. A process according to claim 33, further comprising:
  iv) providing each building panel with at least one of a matching line and a unique identification to assist in installation.

36. A process for the manufacturing of a decorative surface, the decorative surface being formed from a plurality of building panels, each building panel comprising an upper surface having a surface area, a lower surface, and edges joining the upper and lower surfaces, the edges being provided with at least one of a tongue and a groove, the process comprising,
  i) selecting a digitized design at a first location;
  ii) transmitting the digitized design via the Internet to a second location; and
  iii) providing the upper surfaces with a decor layer, the decor layer comprising a pattern, the pattern being derived from the digitized design.

37. The process of claim 26, further comprising sprinkling scratch resistant particles on the building panels, the particles being at least one selected from the group consisting of α-aluminum oxide, silicone carbide, silicon oxide and diamond.

* * * * *